H. E. RAWSON.
FISHING REEL.
APPLICATION FILED JULY 25, 1921.

1,430,753.

Patented Oct. 3, 1922.

INVENTOR
H. E. Rawson
BY Munn & Co.
ATTORNEYS

Patented Oct. 3, 1922.

1,430,753

UNITED STATES PATENT OFFICE.

HOMER E. RAWSON, OF CHICAGO, ILLINOIS, ASSIGNOR TO RICHARDSON ROD AND REEL COMPANY, OF CHICAGO, ILLINOIS, A CORPORATION OF ILLINOIS.

FISHING REEL.

Application filed July 25, 1921. Serial No. 487,268.

*To all whom it may concern:*

Be it known that I, HOMER E. RAWSON, a citizen of the United States, and a resident of Chicago, in the county of Cook and State of Illinois, have invented a new and useful Improvement in Fishing Reels, of which the following is a full, clear, and exact description.

My invention relates to fishing reels of the type of construction in which a line-holding spool may be disconnected from manually operable spool-operating means to permit the spool to spin freely, and it consists in the combinations, constructions and arrangements herein described and claimed.

An object of my invention is to provide a fishing reel in which means for operating the spool can be moved at will into and out of operative engagement with the spool.

A further object of my invention is to provide a device of the character described having means for normally maintaining the spool-operating means in adjusted position with respect to the spool, whereby a positive action on the part of the operator is required to occasion the engagement or disengagement of the spool-operating means with the spool.

A further object of my invention is to provide a reel of the character described in which the spool is permitted to spin or rotate about its axis without any drag or braking force being applied thereto when the spool is under the control of the spool-operating means and when the spool is disengaged from the spool-operating means.

A further object of my invention is to provide a device in which the spool may rotate independently of the spool-operating means in either direction or may be rotated in either direction by manual operation of the spool-operating means.

Other objects and advantages will appear in the following specification, and the novel features of the invention will be particularly pointed out in the appended claims.

My invention is illustrated in the accompanying drawings forming part of this application, in which—

Figure 1:
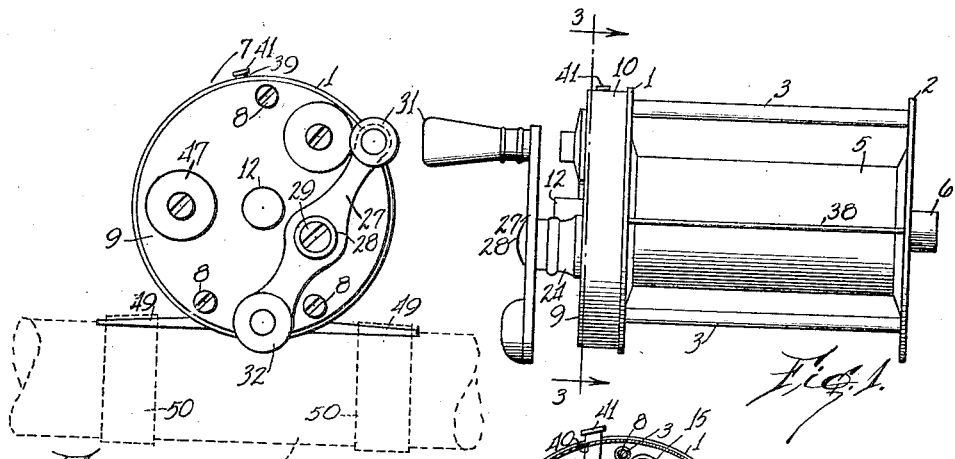
Figure 1 is a plan view of a reel embodying the invention.
Figure 2:
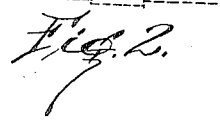
Figure 2 is a side elevation of the reel attached to a fishing rod.

Referring now to the drawings, it will be noted that a reel embodying my invention includes a frame consisting of spaced apart parallel side members 1 and 2 connected by transverse tie rods 3 and 3S. A central shaft 4 is journaled in the side members 1 and 2 and projects through the frame member 1, as shown. A spool 5 is mounted on the shaft 4 to rotate therewith between the side frame members 1 and 2. The shaft 4 may also protrude beyond the outer face of the side frame member 2 in which event a bearing cap 6 is provided. The parts described so far are ordinary in construction and form no part of my invention except in so far as they cooperate with the parts which will now be described.

Figure 5:
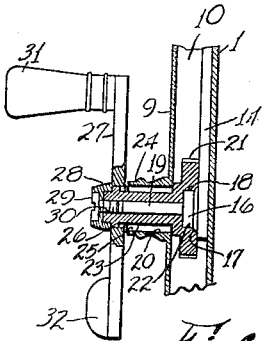
Figure 5 is an enlarged section along the line 5—5 of Figure 3.

A housing 7 is attached to the outer face of the frame member 1 by means of screws 8, or the like, and, as illustrated, consists of a cover plate 9 formed with a laterally extending annular flange 10 arranged with its outer end in engagement with the frame member 1. The screws 8 are projected through openings in the plate 9 into engagement with threaded openings 11 in the outer ends of the tie members 3. The shaft 4 extends through the plate 9 and is arranged to enter a bearing cap 12 attached to the outer face of the cover plate 9. A gear 13 is rigidly mounted on the portion of the shaft 4 interposed between the frame member and the plate 9. A swingable arm 14 is pivotally attached at one end, as at 15, to the outer face of the frame member 1. The arm 14 has an integral boss 16 extending laterally thereof adjacent to its free end. The boss 16 is formed with a rounded or convex surface adjacent to its base, as at 17, and is reduced at 18 and further reduced at 19 to provide a shaft that protrudes through an opening 20 in the plate 9 exteriorly of the latter, as best seen in Figure 5. The base portion 17 of the boss 16 provides a bearing surface for a relatively large gear 21 having an axial bore 22 adapted to receive a portion 18 of the extension to the boss. The gear 21 is formed with an integral hub 23 mounted on the shaft portion 19 of the extension and projecting through the opening 20 beyond the outer end of the shaft 19. It is to be observed that the opening 20 is diametrically larger than the outer diameter of the hub 23 received therein and in consequence the hub 23 may be moved transversely of its axis.

Figure 3:
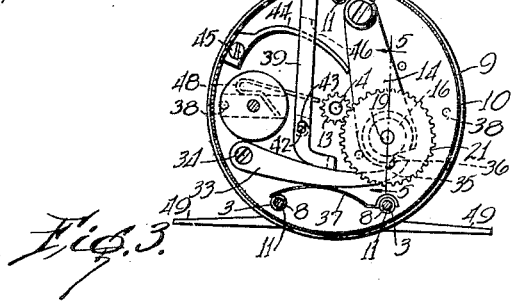
Figure 3 is a section through the reel along the line 3—3 of Figure 1.
Figure 4:
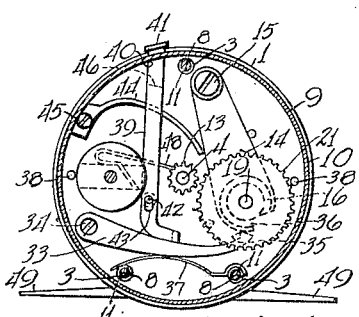
Figure 4 is a view similar to Figure 3, showing relatively movable parts of the device in positions other than those illustrated in Figure 3.

The plate 9 has an integral boss 24 extending laterally of its outer face from the opening 20 and provided with a bore 25 having a diameter equal to that of the opening 20. The hub 23 is formed with an integral non-circular enlargement 26 adjacent to its outer end on which is mounted a crank arm 27 which is spaced from the outer end of the boss 24. A cap 28 is disposed on the outer end of the hub 23 and a screw 29 projected therethrough into engagement with the interiorly threaded bore 30 of the hub 23 maintains the crank arm 27 in the position illustrated in Figure 5, whereby the gear 21 will be rotated when the crank arm 27 is operated. The crank arm 27 is of the usual type of construction, being mounted intermediately on the hub 23 and provided at one end with a handle 31 and with a counterweight 32 at its other end. A pawl 33 is loosely mounted on a pin or screw 34 fast in the frame member 1 and protruding from the outer face thereof. The pawl 33 is equipped with a hook 35 at its free end adapted to engage a shoulder 36 in the free end of the arm 14. A curved spring 37 is mounted at one end on the adjacent tie rod 3, projecting through the frame member 1 and reacts at its other end against the tie rod 3 adjacent thereto. It is to be observed that the spring 37 is arranged to bear against the adjacent side of the pawl 33 at a point intermediate the length of the latter and substantially intermediate the length of the spring 37. The spring 37 thus exerts a pressure on the pawl 33 that tends to maintain the hook 35 in engagement with the shoulder 36, as illustrated in Figure 3. At this time, the gear 21 is in mesh with the gear 13 and drives the latter when the crank arm 27 is operated. A push rod 39 is slidably received in an opening 40 in the flange 10 so that the head 41 thereof is positioned exteriorly of the housing 7. The push rod 39 is guided and retained in its slidable movement by a guiding and retaining pin or screw 42 that is projected through the frame 9 into engagement with a longitudinally extending slot 43 in the push rod. The latter is bent obliquely adjacent to its inner end and is arranged to bear against the side of the pawl 33 that is opposite the side thereof engaged by the spring 37, whereby the pawl 33 may be moved against the action of the spring 37 and the hook 35 thus moved out of engagement with the shoulder 36. A leaf spring 44 is attached at one end to the outer face of the frame member 1, as at 45, and is arranged with its free end bearing against the adjacent side of the arm 14, whereby the pressure of the spring tends to move the arm 14 from the position illustrated in Figure 3 to the position illustrated in Figure 4. The push rod 39 is provided with a recess 46 through which a portion of the spring 44 extends, whereby the push rod 39 may be moved in the direction of its length without interfering with the functioning of the spring 44.

From the foregoing description of the various parts of the device, the operation thereof may be readily understood. The reel may be equipped with the usual slidable button 47 carried by the housing 7, by means of which a spring member 48 may be moved into and out of engagement with the gear 13. When the spring member 48 is in engagement with the gear 13, the desired "click" will result when the spool 5 is rotated. The reel may also be equipped with the usual oppositely extending lugs 49—49 for engaging with retaining rings 50, whereby the reel is held in a desired position on a rod 51. In reels having spool-operating means capable of being moved out of engagement with the spool, of which I am aware, the spool and the spool-operating means are automatically disconnected when either is moved in a certain direction and are automatically connected when the direction of movement of either is reversed. In practice, when devices of the character described and provided prior to my invention are used, the disconnection of the spool from the spool-operating means frequently occurs at an inopportune time on account of the automatic action of the release, as for instance, when the operator is "playing" a fish. It is manifest that this is a very unsatisfactory condition and this condition is obviated when my device is used. Furthermore, the mechanism interposed between the spool and the spool-operating means usually exerts a braking force on the spool when the latter is connected with the spool-operating means. When my device is used, the spool may rotate or spin freely in either direction when disconnected from the operating member 27 and may likewise be rotated in either direction when the member 27 is operated. In casting operations, the thumb is placed on the head 41 of the push rod 43 and the latter is pressed downwardly immediately before the bait or plug is thrown. The pressure exerted on the push rod 39 will be communicated to the arm 33 and will cause the hook 35 to disengage the shoulder 36. The pressure of the spring 44 then moves the arm 14 into the position illustrated in Figure 4. It is to be observed that the hook 35 of the pawl 33 now engages the end of the arm 14 and relieves the push rod 39 of any strain that may result on account of the pressure of the spring 37 thereagainst. It will be observed that the spool 5 will be disconnected from the controlling mechanism described before the cast is made and may therefore be started to rotate by a minimum torque and will spin freely about its axis to pay out the line. When the cast has been completed or a strike has been made and the handle 31 is grasped for manipulation in retrieving the line, the pull naturally exerted on the handle at the time it is grasped will move the hub 23 transversely of its axis against the action of the spring 44 and will bring the gear 21 into mesh with the gear 13. The spring 37 will then move the pawl 33 and the push rod 39 into the position illustrated in Figure 3, whereby the operating member 27 is again locked in position to control the operation of the spool 5, and a line, not shown, may be retrieved when the member 27 is operated. Since the parts of the spool-operating mechanism which have been described in detail herein are movable as a unit, it is obvious that no braking force will be applied to the spool when connected with the spool-operating means or disconnected therefrom.

I claim:

1. A reel comprising a frame consisting of spaced apart parallel frame members and transverse tie members connecting the frame members, a central transverse shaft journalled in the frame members and projecting laterally of the outer face of one of them, a spool rigidly mounted on the shaft to rotate between the frame members, a gear rigidly mounted on the projecting end of the shaft, a swingable arm pivotally attached to the frame, a driving gear supported on said arm adjacent to its free end and arranged to mesh with the first named gear when the swingable arm is in a certain position, manually operable means engaging with said driving gear for rotating said gear and for moving said swingable arm into position to cause said driving gear to mesh with the first named gear, means engaging said swingable arm and exerting a pressure thereon tending to move the latter to cause said driving gear to disengage the first named gear, other means engaging said swingable arm for normally holding the latter in position to cause said driving gear to mesh with the first named gear, and means operable at will for moving said last named holding means out of operative engagement with the swingable arm.

2. A reel comprising a frame consisting of spaced apart parallel frame members and transverse tie members connecting the frame members, a central transverse shaft journaled in the frame members and projecting laterally of the outer face of one of them, a spool rigidly mounted on the shaft to rotate between the frame members, a gear rigidly mounted on the projecting end of the shaft, a swingable arm pivotally attached to the frame, a driving gear supported on said arm adjacent to the free end of the latter and arranged to mesh with the first named gear when the swingable arm is in a certain position, manually operable means engaging with said driving gear for rotating said gear and moving said swingable arm into position to cause said driving gear to mesh with the first named gear, means engaging said swingable arm and exerting a pressure thereon tending to move the latter to cause said driving gear to disengage the first named gear, spring pressed means engaging said swingable arm for normally holding the latter in position to cause said driving gear to mesh with the first named gear, and means operable at will for moving said last named holding means out of operative engagement with the swingable arm.

3. A reel comprising two stationary disks, rods securing said disks together, a supporting base rigidly secured to said rods, a spool rotatably carried by said disks, a crank arm adapted to be operatively connected to said spool and to be moved into and out of operative engagement with said spool, a casing carried by one of said discs, a push rod extending at right angles to said base and being disposed between said casing and the adjacent disc, said push rod when moved inwardly being adapted to disconnect said crank from said spool, said crank being adapted to be manually moved into engagement with said spool.

4. The combination with a frame having a supporting base and a spool rotatably disposed therein, a casing, a pinion rigidly secured to said spool and disposed in said casing, and an integral sleeve communicating with said casing, of an arm pivotally mounted in said casing, a gear rotatably carried by the free end of said arm, said gear having an integral shank loosely disposed in said sleeve, a crank operatively connected to said shank, said crank adapted to be moved so as to mesh said gear with said pinion, a spring pressed pawl for locking said arm, a push rod adapted to release said pawl from said arm, said rod projecting from the casing at a point diametrically opposite said base, and a spring for moving said arm so as to disengage said gear from said pinion.

HOMER E. RAWSON.